Oct. 26, 1965   M. C. CLERC   3,214,666
MOTOR SPEED CONTROLLER
Filed Dec. 20, 1961   2 Sheets-Sheet 2

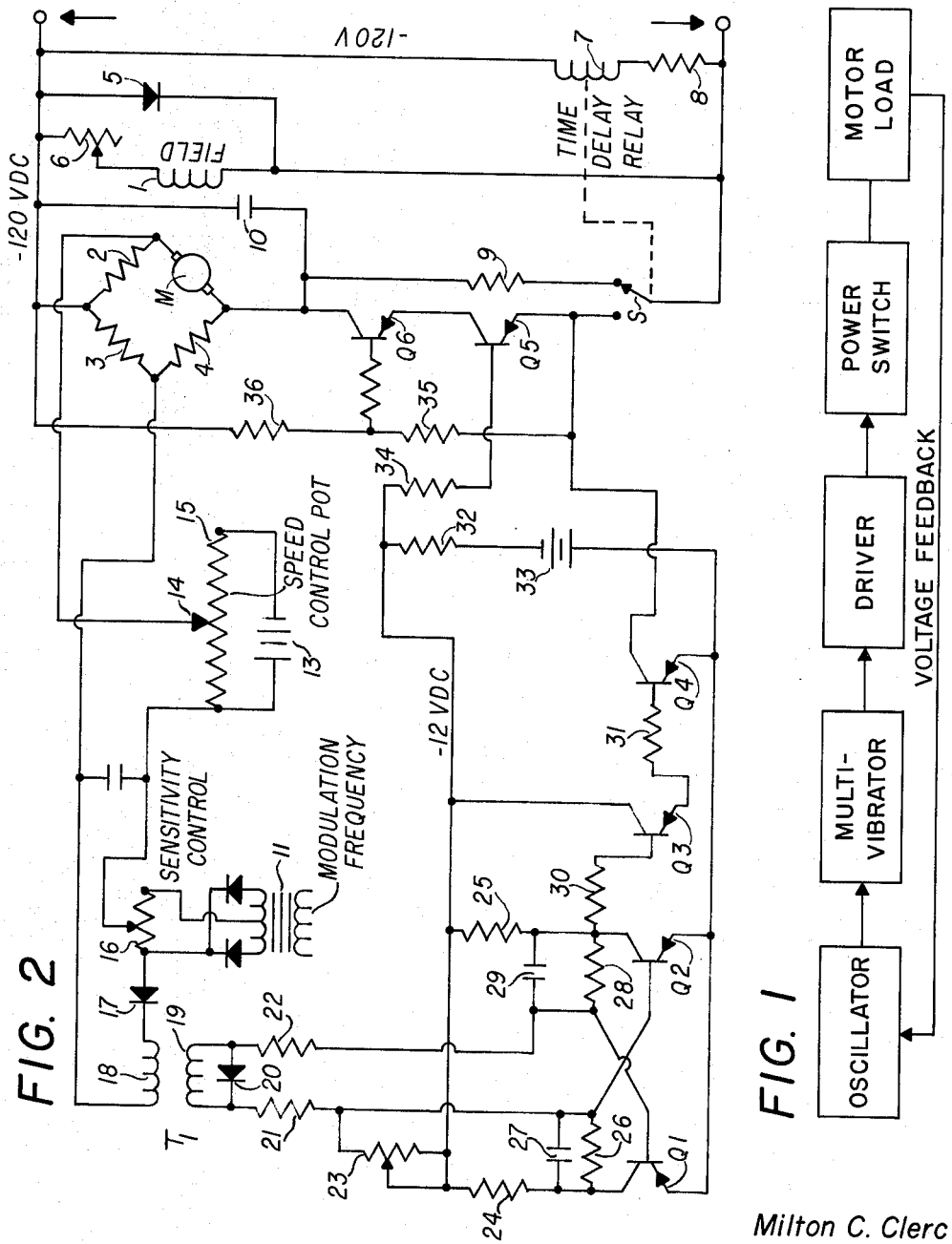

Milton C. Clerc
INVENTOR.

BY Robert C Peterson
Attorney

United States Patent Office 3,214,666
Patented Oct. 26, 1965

3,214,666
MOTOR SPEED CONTROLLER
Milton C. Clerc, Houston, Tex., assignor to Texas Instruments Incorporated, Dallas, Tex., a corporation of Delaware
Filed Dec. 20, 1961, Ser. No. 160,756
5 Claims. (Cl. 318—317)

This invention relates to motor speed controllers and more particularly to motor speed controllers for controlling the speed of a direct current motor by varying the time of applying power across the armature.

The speed of direct current motors varies under different load conditions. As the speed of a direct current motor varies, the voltage characteristic thereof also varies proportionally.

In one aspect, the invention herein described utilizes the back E.M.F. of a motor to clip modulation frequency signals to produce pulses of varying pulse duration. The modulation frequency signals of varying pulse duration are coupled to a bistable multivibrator which in turn through a driver and power switch varies the average power to the motor armature by changing the power off-on time. As the motor speed varies, the back E.M.F. which has been smoothed to a slow changing D.C. level is algebraically added to a voltge across a speed control potentiometer, thereby furnishing a clipping level through a gate diode for the modulation frequency. In this embodiment at increasing motor speeds or back E.M.F., the output pulse duration of the bistable multivibrator decreases, thereby decreasing the average power to the motor.

Another aspect of the invention utilizes the motor armature voltage developed across a speed control potentiometer to provide a slow changing D.C. potential to clip modulation frequency signals producing pulses of a varying pulse duration. As the motor speed varies, the armature voltage varies as a slow changing D.C., providing a clipping level through a gate diode for the modulation frequency. The pulses of varying pulse duration are coupled to a bistable multivibrator which through a driver and power switch varies the average power to the motor armature by changing the power on-off time. Further in this aspect, a regenerative armature current feedback circuit is provided which tends to keep power applied through the power swtich to the motor armature.

It is therefore an object of the present invention to provide a motor speed controller in which a motor feedback circuit clips a modulation frequency to vary the pulse duration of a bistable multivibrator, thereby controlling the average power to the motor.

It is another object of the invention to provide a motor control circuit including the motor armature which limits by back biasing a gate diode the pulse duration of modulation frequency signals that control the on-off time of power to the motor armature.

It is another object of the invention to provide a motor control affected by the armature voltage appearing across a speed control potentiometer which biases a gate diode to clip a modulation frequency, thereby varying the pulse duration of a bistable multivibrator controlling the average power to the motor armature.

It is a further object of the invention to provide a motor control circuit which detects by a bridge network including the armature of a D.C. motor, the back E.M.F. of the motor and provides a reverse bias to a gate diode which limits the pulse duration of modulation frequency signals as the input to a threshold multivibrator device that controls an armature power switch for the motor, thereby controlling the average power furnished the motor.

It is still a further object of the invention to provide a motor speed controller which varies the average power to the motor armature by pulse duration modulation of a power switch employing regenerative feedback to give the motor a slightly rising speed characteristic.

These and other objects and advantages of the invention will be readily apparent in the following detailed description taken in conjunction with the appended claims and the drawings wherein:

FIGURE 1 is a block diagram of the motor control circuit employing voltage feedback from the motor load;

FIGURE 2 is a detailed circuit diagram illustrating the control circuit in which the motor back E.M.F. appears as an unbalance voltage across a bridge circuit;

Figure 4:
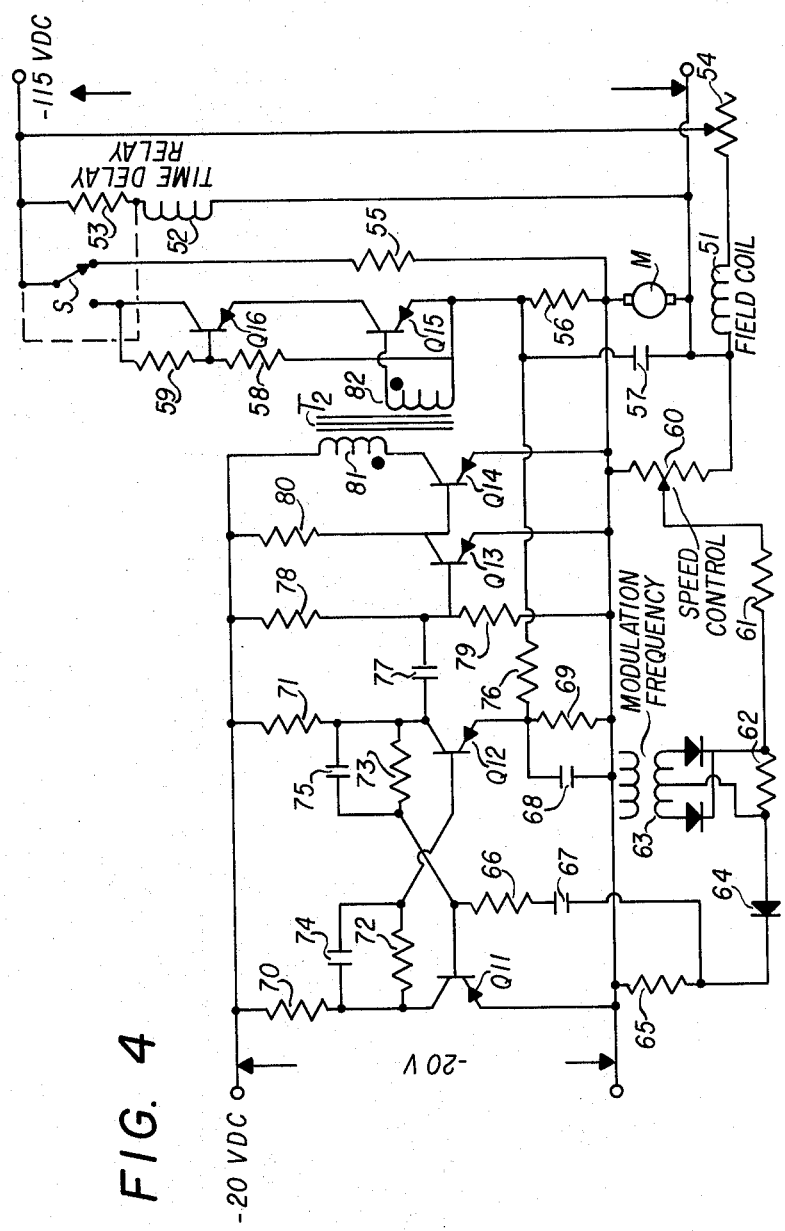
FIGURE 4 is a detailed circuit diagram illustrating the motor speed control utilizing an armature voltage feedback and a regenerative armature current feedback to provide a rising speed characteristic to the motor.

Referring to FIGURE 1, power is supplied to a motor load by a power switch which applies voltage across the motor load in response to varying pulse durations transmitted to the power switch driver from a multivibrator. An oscillator provides pulses to operate the multivibrator for varying pulse durations above a threshold value established by the voltage feedback from the motor load. In this manner the output from the multivibrator to the driver is a square wave pulse of varying duration. This square wave is applied by the driver to turn the power switch off and on for various periods of time.

Referring specifically to FIGURE 2, there is illustrated a motor controller. A motor M has its armature as one leg of a bridge network including resistors 2, 3 and 4 which are all equivalent to the armature resistance of motor M. The motor field circuit consists of field coil 1 in series with dropping resistor 6. Across the field circuit, a —120 volt D.C. potential is applied. The motor field is protected by diode 5. Starting power is supplied to motor M through resistor 9 in series with the bridge circuit containing motor M. The controlled power is supplied to motor M through power switch consisting of transistors Q5 and Q6 in series with the bridge circuit. Switching of the power source to the motor M through the power switch having transistors Q5 and Q6 is performed by time delay relay 7 in series with resistor 8. Capacitor 10 maintains a slow changing D.C. potential across the bridge circuit including the motor armature.

The control circuit includes a speed control potentiometer 15 having a voltage impressed thereacross by a battery 13. The positive D.C. voltage developed on potentiometer 15 is provided in a series circuit with a sensitivity control resistor 16, a diode 17 and primary 18 of transformer $T_1$ and through the bridge circuit to the wiper arm 14 of potentiometer 15. The unbalanced voltage of the bridge circuit containing the armtaure of motor M is applied opposing the voltage to the positive D.C. of battery 13. A modulation frequency transformer 11 develops rectified sine waves, triangular waves or sawtoothed waves across the resistor 16.

The input circuit to a bistable multivibrator consisting of transistors Q1 and Q2 consists of the secondary 19 of transformer $T_1$. The diode 20 shunts the secondary 19 of transformer $T_1$. A current-limiting and isolation resistor 21 couples a positive going pulse to the base of transistor Q2. A current limiting and isolation resistor 22 is provided in series with diode 20, resistor 21 and resistor 23. Resistors 24 and 25 are provided as collector load resistors for transistors Q1 and Q2 respectively. The collector voltage of transistor Q1 is coupled to the base of transistor Q2 by the parallel circuit of resistor 26 and capacitor 27. The collector voltage of transistor Q2 is coupled to the base of transistor Q1 by the parallel circuit of resistor 28 and capacitor 29. A battery 33 supplies −12 volts D.C. to the collectors of transitsors Q1 and Q2. Potentiometer 23 applies a negative bias to the base of transistor Q2 to maintain it conducting. The driver circuit consists of emitter-follower transistor Q3 and transistor Q4. Resistor 30 applies the collector voltage of transistor Q2 to the base of transistor Q3. The collector of transistor Q3 is coupled to the −12 volt battery. Emitter follower resistor 31 couples the emitter voltage to the base of transistor Q4. The collector of transistor Q4 is coupled to the emitter of power switch transistor Q5, thus completing when transistor Q4 conducts the emitter base circuit through resistor 34 to bias transistor Q5 into conduction. The collector of transistor Q5 is coupled to the emitter of transistor Q6. The base of transistor Q6 is biased by the voltage divider consisting of resistors 35 and 36.

In operation, a 120 volt D.C. is applied to the motor M through resistor 9 and the bridge network including the armature of motor M and resistors 2, 3 and 4. After a time delay the motor starting relay 7 is energized to operate contact S and apply power to motor M through the power switch consisting of transistors Q5 and Q6.

As the speed of motor M increases it generates a back E.M.F., unbalancing the bridge circuit including the motor M to oppose the forward biasing of diode 17 by speed control potentiometer 15. The back E.M.F. generated increases with increasing motor speed and eventually reverse biases diode 17. Until diode 17 is reverse biased, the rectified modulation frequency pulses are applied across the primary 18 of transformer $T_1$ and coupled by the secondary 19 thereof as positive going pulses to the base of transistor Q2, cutting it off and turning on the driver and power switch, thereby increasing the average power furnished to the motor M armature. Once the diode 17 is reverse biased by the back E.M.F. voltage from motor M exceeding the set voltage on the speed control potentiometer 15, diode 17 begins to clip the rectified modulation frequency pulses, thereby decreasing the pulse duration during which transistor Q2 is cut off. Therefore, as the speed of motor M tends to increase, the back E.M.F. of motor M tends to increase further the reverse biasing of diode 17, thereby limiting the pulse duration of the modulation frequency coupled by transformer $T_1$ to the multivibrator consisting of transistors Q1 and Q2.

Figure 3:
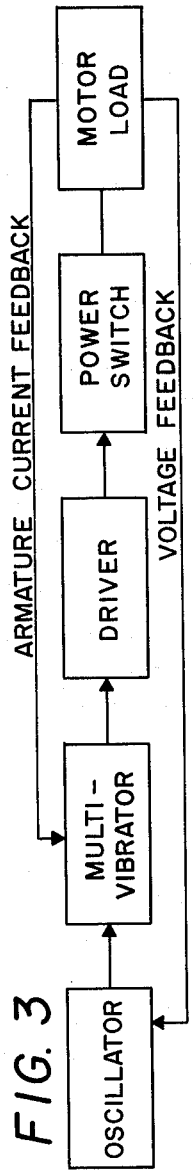
FIGURE 3 is a block diagram illustrating both a voltage feedback and current feedback from the motor load to provide motor speed control.

In another embodiment of the invention, as illustrated in FIGURE 3, a voltage feedback from the motor load to the oscillator controls the modulation pulse duration thereby controlling the pulse duration of the multivibrator. The driver circuit controls the power switch in accordance with the output of the multivibrator, thereby supplying power to the motor load. In order to give the motor an increasing speed characteristic, a regenerative armature current feedback is provided to the output stage of the multivibrator.

Referring to FIGURE 4, the detailed circuit diagram therein illustrates the motor speed controller having a regenerative armature current feedback. The motor M has its armature in series with starting resistor 55. A 115 volt D.C. potential is applied across the motor M and resistor 55. The motor is provided with a time delay relay 52 in series with a resistor 53. After a delay, the power to motor M is supplied through the power switch consisting of transistors Q15 and Q16. The field for motor M is supplied by the field coil 51 in series with resistor 54 having the D.C. voltage applied thereacross. The voltage appearing across the armature of motor M is applied across the speed control potentiometer 60. A capacitor 57 provides a smoothing of the power applied by the power switch consisting of transistors Q15 and Q16 in series with the resistor 56 and motor M armature.

The wiper arm on speed control potentiometer 60 is connected through series circuit of resistor 61, resistor 62, diode 64 and resistor 65 to the negative side of speed control potentiometer 60. Modulation frequency transformer 63 couples a negative going wave form through resistor 62 to the plate of diode 64. The wave form may be either a sine, triangular or sawtooth wave form. The speed control potentiometer 60 provides a forward bias to diode 64. When diode 64 conducts, a positive going signal is developed across the resistor 65 and coupled by capacitor 67 and resistor 66 to the base transistor Q11 which is the input to the bistable multivibrator consisting of transistors Q11 and Q12. The emitter of Q11 is grounded, and the collector of Q11 is coupled by resistor 70 to a −20 volts D.C. supply. The collector voltage of transistor Q11 is coupled by the parallel circuit of resistor 72 and capacitor 74 to the base of transistor Q12. The collector of transistor Q12 is connected by resistor 71 to the −20 volts D.C. supply. Collector voltage of transistor Q12 is coupled by the parallel circuit of resistor 73 and capacitor 75 to the base of transistor Q11. The emitter of transistor Q12 is grounded through the parallel circuit of capacitor 68 and resistor 69. The voltage developed by armature current resistor 56 is coupled through resistor 76 between resistor 69 and the emitter of transistor Q12.

The output from the collector of transistor Q12 is coupled by capacitor 77 to the base of first stage of the driver consisting of transistors Q13 and Q14. The base of transistor Q13 is biased by the series circuit of resistors 79 and 78 connected to the −20 volts D.C. power supply. The emitter of transistor Q13 is grounded, and the collector is coupled to the −20 volts D.C. by resistor 80. The base of transistor Q14 is connected to resistor 80 and to the collector of transistor Q13. The emitter of transistor Q14 is grounded. The collector of transistor Q14 is coupled through the primary 81 of transformer $T_2$ to the −20 volts D.C. power supply. The collector output of transistor Q14 is coupled by transformer $T_2$ through its secondary 82 to the base of transistor Q15 in the power switch.

The emitter of transistor Q15 is connected in series with resistor 56 and motor M. The collector of transistor Q15 is connected to the emitter of transistor Q16. Bias is supplied to the base of transistor Q16 by the voltage divider of resistor 58 and 59 in series with resistor 56 and motor M. The collector of transistor Q16 is coupled by relay contact S to the negative side of the D.C. potential.

In operation, as the motor M is initially started, power is supplied thereto through resistor 55. After a delay, time delay relay 52 is energized, applying power to motor M by relay contact S through the power switch consisting of transistors Q15 and Q16. As motor M speeds up, speed control potentiometer 60 tends to supply forward bias to diode 64. Modulation frequency transformer 63 supplies a negative-going voltage waveform to the plate of diode 64. Since diode 64 tends to be forward biased by the speed control potentiometer 60, it conducts until the forward bias of diode 64 is overcome by the negative-going modulation pulses developed over resistor 62. During the period when diode 64 conducts, a positive-going pulse is developed by resistor 65 and is coupled to the base of transistor Q11 causing said base to go positive with respect to the emitter and therefore cut off. When transistor Q11 cuts off, its collector goes more negative, coupling a negative voltage to the base of the transistor Q12 causing it to conduct. The output from transistor Q12 couples a positive-going pulse to the base of transistor Q13 causing it to cut off. As transistor Q13 becomes cut off the collector voltage goes negative thus causing the base of transistor Q14 to go negative. When the base of transistor Q14 goes negative, transistor Q14 conducts, generating a positive-going signal in the primary 81 of transformer $T_2$ which is the collector load for transistor Q14. The secondary 82 of the transformer $T_2$ produces a positive-going pulse at the base of transistor Q15 causing it to cut off. In the above-described manner the average power to the motor M is controlled by varying the pulse duration during which transistors Q15 and Q16 of the power switch conduct.

From the above it will be understood, as illustrated in FIGURE 4, that as the speed of motor M increases transistor Q11 of the bistable multivibrator is cut off for longer and longer periods of time. The regenerative current feedback from resistor 56 to the emitter of transistor Q12 opposing the increasing negative voltage to the emitter of transistor Q12 thus tends to keep it cut off, thereby tending to increase the "on" time of the power switch. In this manner the regenerative feedback provides an increasing speed characteristic to the motor M.

It will be appreciated that various changes and modifications to the control circuits described herein will become readily apparent to those skilled in the art and such modifications and changes are within the scope and spirit of the invention as defined in the appended claims.

What is claimed is:

1. A direct current motor speed controller comprising a direct current motor, a direct current power source, a power switch connected between said power source and said motor to periodically energize said motor, means to detect the armature voltage across said motor, a bistable multivibrator, a modulation frequency means to provide input pulses of varying pulse duration to said bistable multivibrator to produce a variable duration output corresponding to the armature voltage of said motor, driver means responsive to the output of said multivibrator to generate the control signals to energize said power switch, and an armature current regenerative feedback circuit coupling to said power switch a portion of the power flowing from said power source to the armature of said motor and tending to maintain power applied to said motor.

2. A direct current motor speed controller comprising a direct current motor, a direct current power source, a power switch connected between said power source and said motor to periodically energize said motor, means to detect the armature voltage across said motor, a bistable multivibrator, a modulation frequency means to provide input pulses of varying pulse duration to said bistable multivibrator to produce a variable duration output corresponding to the armature voltage of said motor, driver means responsive to the output of said multivibrator to generate the control signals to energize said power switch, and an armature current regenerative feedback circuit coupled to said multivibrator which tends to maintain power applied to said motor.

3. A direct current motor speed controller comprising a direct current motor, a power source, a power switch connected between said motor and said power source responsive to energizing control signals, means to detect the armature voltage across said motor, a bistable multivibrator, a modulation frequency means to provide input pulses of varying pulse duration to said bistable multivibrator to produce a variable duration output corresponding to the armature voltage of said motor, driver means responsive to the output of said multivibrator to provide energizing control signals to said power switch, and an armature current regenerative feedback circuit coupling to said power switch a portion of the power flowing from said power source to the armature of said motor and tending to maintain power applied to said motor.

4. A direct current motor speed controller comprising a direct current motor, a power source, a power switch connected between said motor and said power source responsive to energizing control signals, means to detect the armature voltage across said motor, a bistable multivibrator, a modulation frequency means to provide input pulses of varying pulse duration to said bistable multivibrator to produce a variable duration output corresponding to the armature voltage of said motor, driver means responsive to the output of said multivibrator to provide energizing control signals to said power switch, and an armature current regenerative feedback circuit coupled to said multivibrator which tends to maintain power applied to said motor.

5. A direct current motor speed controller comprising a direct current motor, a direct current power source, a power switch connected between said power source and said motor to periodically apply said power to said motor responsive to energizing control signals, a speed control potentiometer, an electrical network including the armature coil of said motor coupling the voltage appearing across said armature coil to said speed control potentiometer, a bistable multivibrator, an input circuit for said multivibrator comprising the wiper arm of the speed control potentiometer, a modulation frequency source, a diode gate and a signal coupling network, said circuit providing variable pulse duration input pulses to said multivibrator to produce variable duration output signals corresponding to the voltage across said armature coil, driver means responsive to the output signals of said multivibrator to provide the energizing control signals to said power switch, and an armature current regenerative feedback circuit coupled to said multivibrator which tends to maintain said power switch energized.

References Cited by the Examiner

UNITED STATES PATENTS

| | | | |
|---|---|---|---|
| 2,814,012 | 11/57 | Swanson | 318—331 |
| 2,855,554 | 10/58 | Conger et al. | 318—317 XR |
| 2,867,763 | 1/59 | Sichling | 318—317 |
| 3,064,175 | 11/62 | Vergez | 318—341 |

ORIS L. RADER, *Primary Examiner*.

MILTON O. HIRSHFIELD, *Examiner*.